United States Patent [19]

Schlueter

[11] Patent Number: 5,065,569
[45] Date of Patent: Nov. 19, 1991

[54] VALVE INTERLOCK SYSTEM FOR A HARVESTER HAVING AN UNLOADABLE CROP RECEIVING RECEPTACLE

[75] Inventor: Francis E. Schlueter, Des Moines, Iowa

[73] Assignee: Deere & Company, Moline, Ill.

[21] Appl. No.: 554,212

[22] Filed: Jul. 17, 1990

[51] Int. Cl.$^5$ .................... A01D 46/08; A01D 90/00
[52] U.S. Cl. ......................................... 56/16.6; 56/28; 298/22 C
[58] Field of Search ................ 56/16.6, 28, 344, 345, 56/346, 347; 298/22 C; 91/445, 553

[56] References Cited

U.S. PATENT DOCUMENTS

| | | | |
|---|---|---|---|
| 3,965,660 | 6/1976 | Kanengieter et al. | 56/344 |
| 4,519,189 | 5/1985 | Fachini et al. | 56/28 X |
| 4,706,710 | 11/1987 | Meyer et al. | 137/625.47 |
| 4,930,297 | 6/1990 | Schlueter et al. | 56/16.6 |

FOREIGN PATENT DOCUMENTS 929028  5/1982  U.S.S.R. .................... 56/28

Primary Examiner—David J. Bagnell

[57] ABSTRACT

An interlock system for a telescoping dumping basket on a cotton harvester includes a rotary control valve which controls basket telescoping and unloading functions. A lever on the basket operates an interference lock restricting rotation of the control valve away from the telescoping position toward an unloading position when the basket is retracted a preselected amount toward a compact storage position. The lever is connected through a push-pull cable to the lock on the valve so that valve rotation is mechanically restricted when the basket is retracted.

15 Claims, 4 Drawing Sheets

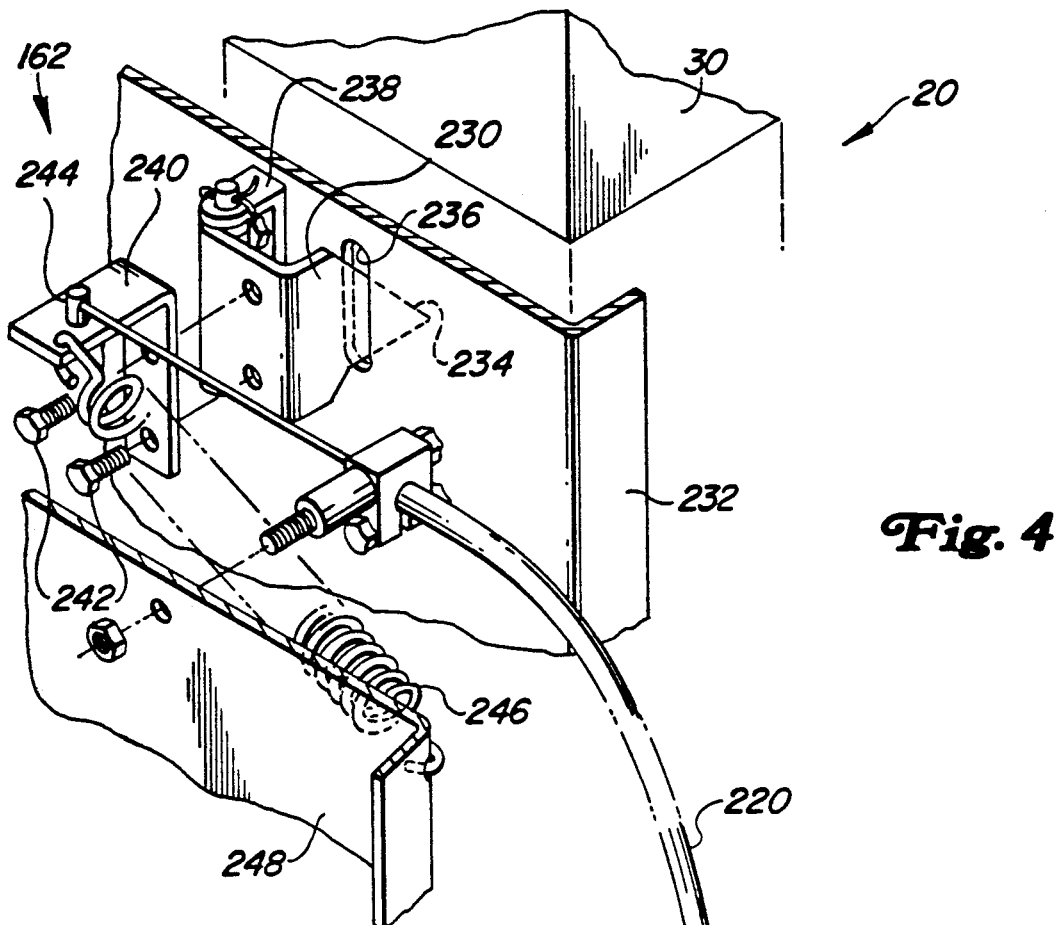
Fig. 4
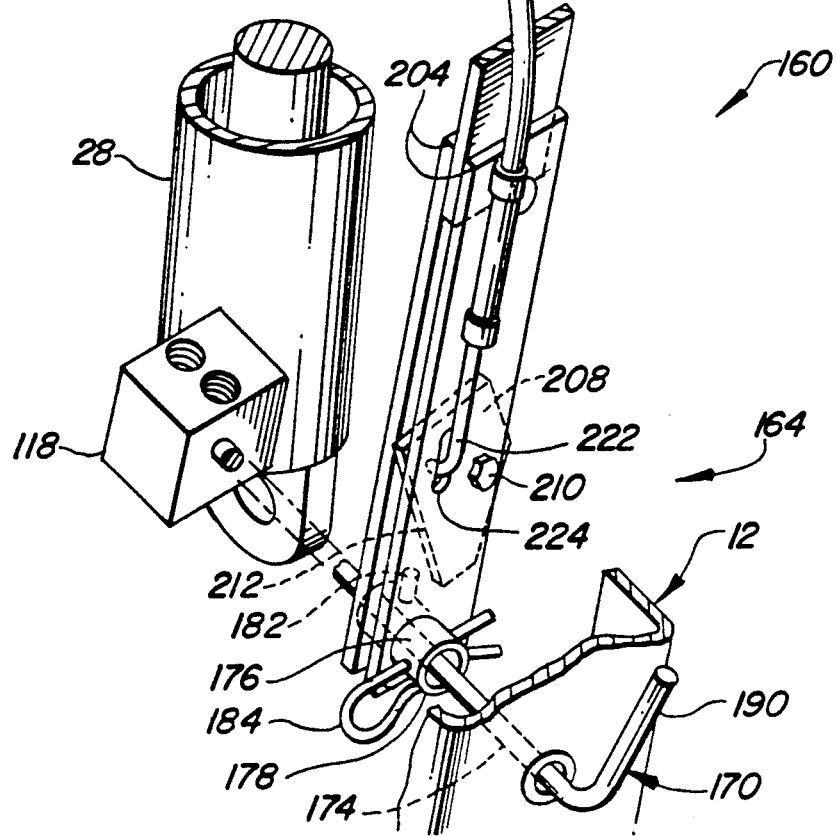

VALVE INTERLOCK SYSTEM FOR A HARVESTER HAVING AN UNLOADABLE CROP RECEIVING RECEPTACLE

BACKGROUND OF THE INVENTION

1) Field of the Invention:

The present invention relates generally to agricultural implements with baskets which collapse or telescope for storage, and more specifically to an interlock system for preventing specific potentially damaging movements of the basket or unloading structure when the basket is in a compact storage position.

2) Related Art:

Implements such as cotton harvesters typically include a large dumpable crop receptacle which can reduce access by the machine to areas where there are overhead space limitations. To alleviate this problem, some machines are equipped with baskets which can be moved to a more compact storage position. For example, the John Deere Model 9960 Cotton Picker includes a telescoping basket generally of the type shown and described in U.S. Pat. No. 4,930,297 issued 5 June 1990 and of common ownership with the present application. Since machine damage can occur if basket dumping is attempted while the basket is retracted, some provision is made to prevent actuation of the hydraulic dump cylinders until the basket is telescoped to the normal working configuration. For example, a separate valve installed in the hydraulic system restricts flow to the dump cylinders when the basket is in the storage position. The separate valve, although providing the necessary interlocking function, adds cost and complexity to the harvester hydraulic system.

BRIEF SUMMARY OF THE INVENTION

It is therefore an object of the invention to provide an improved interlock system for a moveable harvester basket which overcomes the aforementioned problems. It is another object of the present invention to provide such an interlock system which is less costly and complex than at least most previously available systems.

It is a further object of the invention to provide an improved interlock system for a telescoping or collapsing unloading basket which obviates additional hydraulic valves or the like. It is yet another object to provide such a system which utilizes a relatively simple mechanical linkage to prevent movement of the control on an existing valve to a basket unloading position when the basket is in the retracted storage position.

It is still another object of the present invention to provide an improved interlock system for a telescoping basket having two or more operating positions, wherein preselected basket movements are prevented when the basket is telescoped to a position other than an operating position.

An interlock system constructed in accordance with the teachings of the present invention includes a diverter valve that is actuated by a lever or feeler device on the basket to lock the valve in the "telescope" position to thereby prevent actuation of the basket unloading mechanism. The lever is connected through a push-pull cable to an interference member on a rotary diverter valve which controls basket telescoping, unloading and lock functions so that diverter valve rotation away from the telescope position is restricted after the basket is retracted to a position other than a where damage could occur if the unloading mechanism were to be actuated. The valve may be rotated to the unloading position only after the basket is extended beyond a preselected non-interfering position.

The interlock system is simple, eliminates the additional restrictor valve previously utilized, and reduces the cost and complexity of the hydraulic system. The system provides a reliable lock-out of the basket unloading function whenever the basket is moved beyond the preselected retracted position.

These and other objects, features and advantages of the present invention will become apparent to one skilled in the art upon reading the following detailed description in view of the drawings.

BRIEF DESCRIPTION OF THE DRAWINGS

FIG. 4 is perspective view of the basket interlock structure partially broken away to more clearly show function.

DETAILED DESCRIPTION OF THE DRAWINGS

The Cotton Harvester Structure

Figure 1:
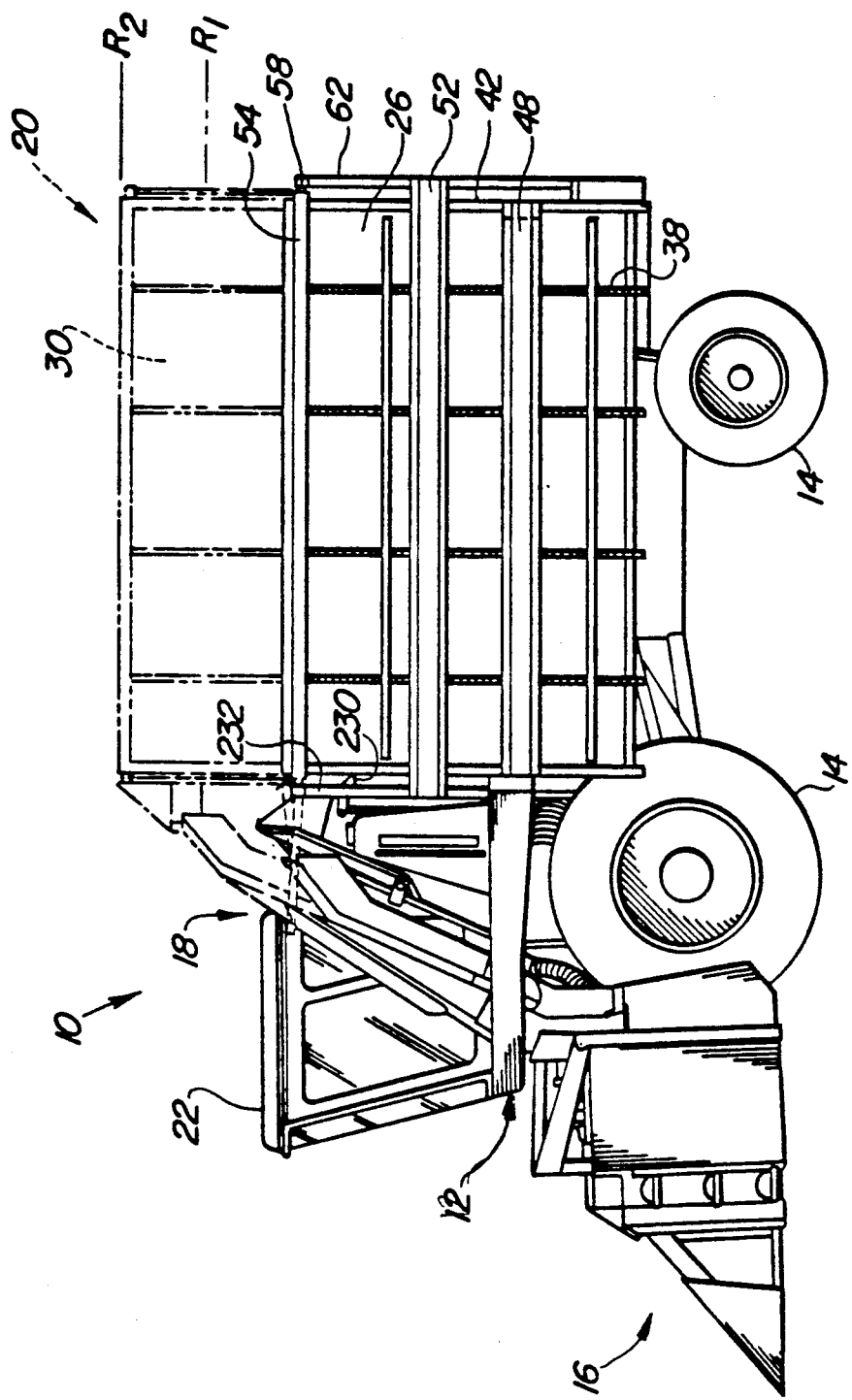
FIG. 1 is a side view of a cotton harvester with a telescoping basket, shown in the extended harvesting position, and including basket interlock structure.

Referring now to FIG. 1, therein is shown a cotton harvester 10 having a main frame 12 supported for forward movement over the ground by wheels 14. Cotton harvesting structure 16 is supported from the forward end of the main frame for removing cotton from rows of cotton plants, and air duct structure 18 is provided for directing the harvested cotton upwardly and rearwardly to basket structure 20 supported on the main frame 12 behind a cab 22.

Figure 2:
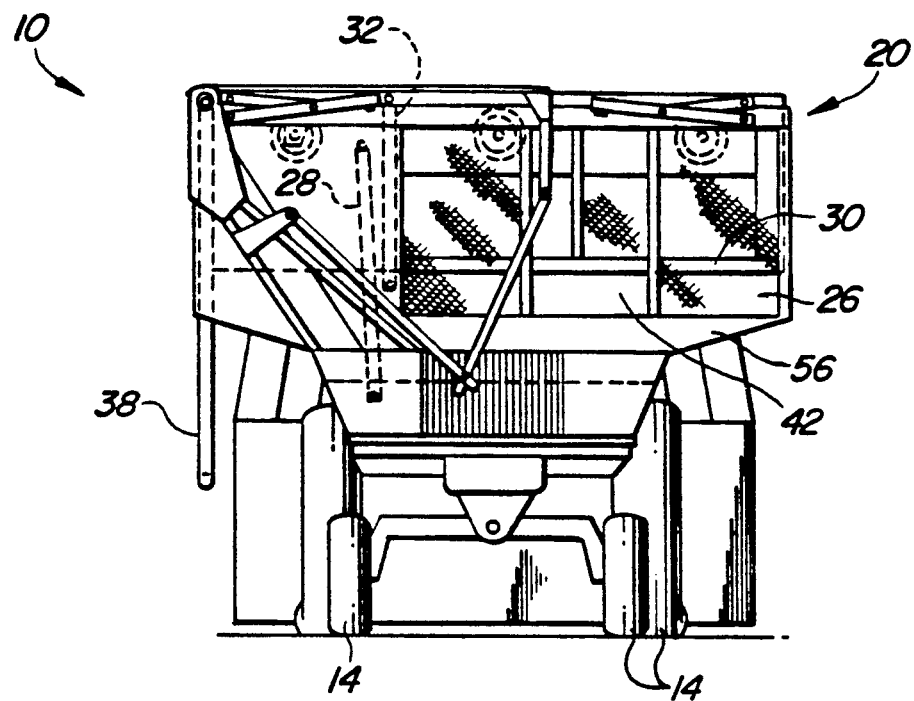
FIG. 2 is a rear view of the cotton harvester of FIG. 1 with the basket in the compact storage position.
Figure 3:
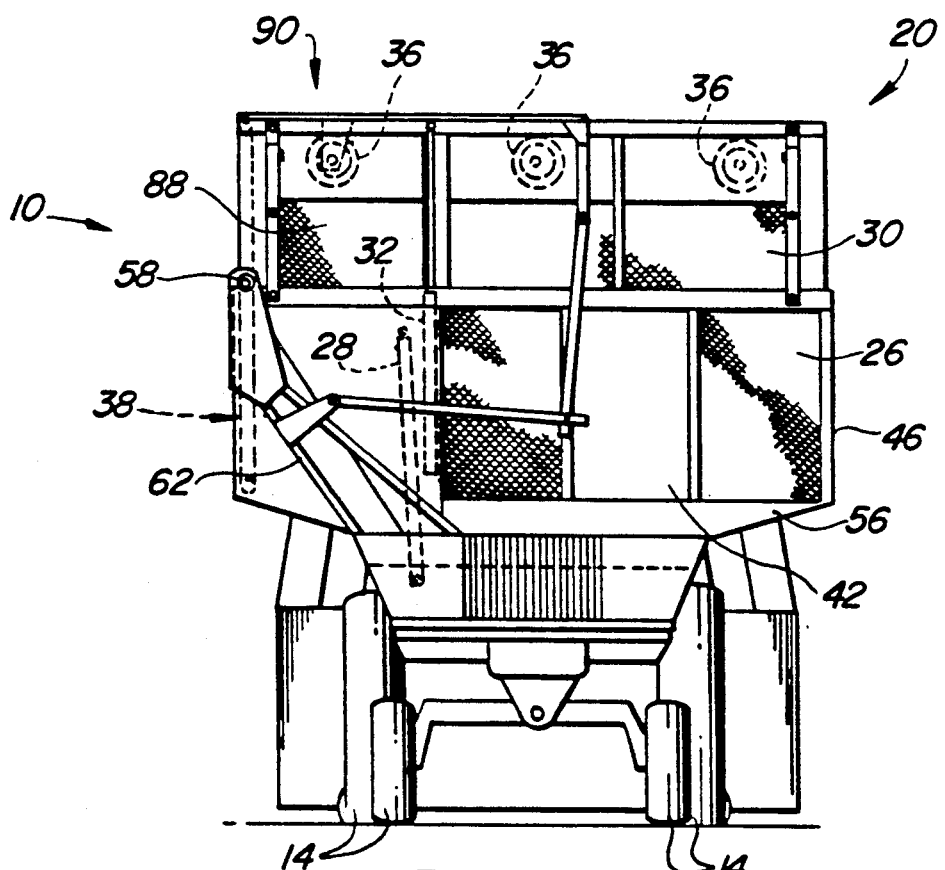
FIG. 3 is a view similar to FIG. 2 but showing the basket telescoped to the fully extended field-working position.

The basket structure 20 includes a lower basket portion 26 supported on the main frame 12 and movable by front and rear hydraulic basket lift or dump cylinders 28 between a field-working position (FIGS. 1 and 3) and a raised dump position (not shown). The basket structure 20 also includes an upper basket portion 30 slidably received within the walls of the lower basket portion 26 for telescoping with respect thereto by front and rear hydraulic basket telescoping cylinders 32 between a lowered storage or transport position (solid lines of FIG. 1, and FIG. 2) and raised field-working positions (see $R_1$ and $R_2$ of FIG. 1, and FIG. 3). The upper basket portion 30 supports compacting auger structure 36 and an unloading conveyor 38 for movement vertically with the upper portion 30 as the cylinders 32 are actuated.

The lower basket portion 26 is substantially rectangular in configuration and includes forward and aft end walls 42 connected by a fore-and-aft extending right-hand (as viewed looking in the forward direction) sidewall 46 located opposite the dump side of the harvester 10. The dump side edges of the walls 42 are connected by lower and upper fore-and-aft extending beams 48 and 52, respectively, and by an upper fore-and-aft extending tube 54. The dump side of the lower basket portion is an open structure which is substantially closed by the unloading conveyor 38 connected to the upper basket portion 30. The lower basket portion 26 is closed by bottom structure 56 which slopes downwardly and inwardly from the sides of the basket.

Pivots 58 project axially from the ends of the upper tube 54 and are journalled in the upper ends of front and rear support masts 62 for rocking by the lift cylinders 28 about a fore-and-aft extending axis between a lowered harvesting position and a raised dump position. When the upper basket portion 30 is telescoped within the lower portion 26 to a position below $R_1$ of FIG. 1, attempted movement of the basket structure 20 toward the dump position causes potentially damaging interference between the conveyor 38 and other areas of the harvester.

The lower basket portion 26 includes a rectangular framework. The upper basket portion 30 has a shape which generally conforms to the shape of the inside of the lower basket portion 26 and is telescopingly received within the portion 26 for vertical movement with respect thereto between a lowered transport or shipping configuration (FIG. 2) and a raised field-working position (FIG. 3) wherein the cotton handling capacity of the basket 20 is substantially increased. The upper basket portion 30 includes a rectangularly shaped framework with an open bottom. Transverse panels indicated at 88 extend from corner to corner on the opposite ends of the upper basket portion 30. A lid 90 is pivotally connected to the upper basket portion 30 for rocking about a fore-and-aft extending pivotal axis between a closed harvesting position and an open dump position.

Figure 5:
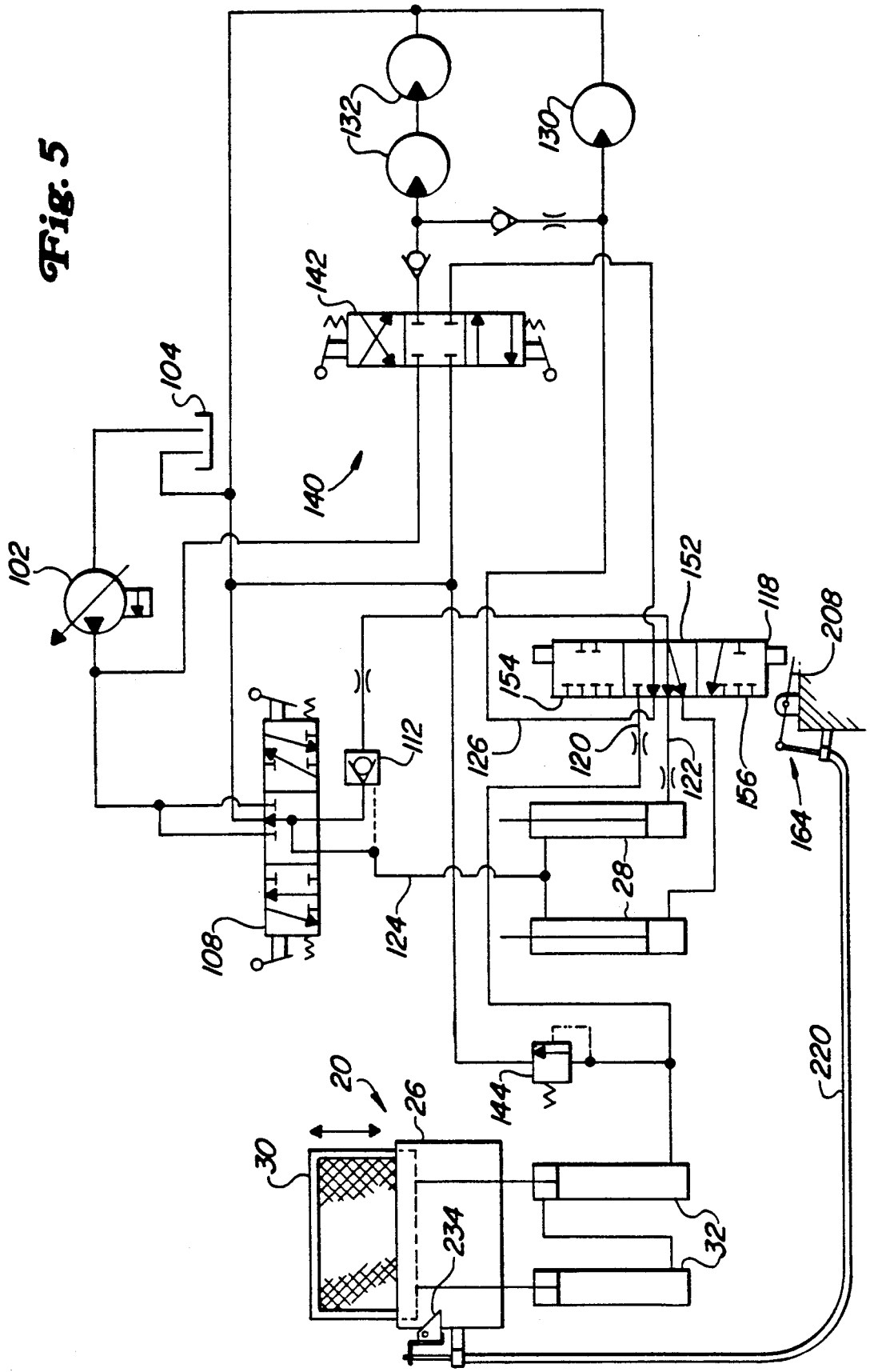
FIG. 5 is schematic representation of a portion of the hydraulic circuit utilized with the harvester and showing the basket interlock structure.

Referring to FIG. 5, therein is shown a portion of the hydraulic circuit diagram for the harvester 10. A source of hydraulic fluid located on the harvester 10 includes a pump 102 connected to a reservoir 104. The output of the pump 102 is connected to an operator controlled reversing valve 108, which, in turn, is connected through a pilot operated check valve 112 to the input of a rotary valve 118. Output 120 of the rotary valve 118 is connected to the base end of one of the series-connected telescoping cylinders 32, and outputs 122 are connected to the base ends of the parallel-connected dump cylinders 28. The rod ends of the dump cylinders 28 are selectively returned via line 124 to either the reservoir 104 or to the output of the pump 102 depending on the position of the reversing valve 108. A fourth output 126 of the rotary valve 118 is connected to unloading conveyor and compacting auger drives 130 and 132, respectively. The output of the pump 102 is also connected through a hydraulic control circuit, indicated generally at 140, to the drives 130 and 132. The circuit 140 includes a control valve 142 for selectively operating the drives 130 and 132 which are connected to the conveyor 38 and compacting augers 36 respectively.

The hydraulic basket telescoping cylinders 32, which are connected at each end of the basket 20 to the lower basket portion 26 near the center of gravity of the portion 26, are plumbed in series to raise and lower in unison. The base end of the second cylinder 32 is connected to a pressure relief valve 144 as well as to the rotary valve output 120.

The rotary valve 118 has three positions, including a normal operating position 152 (the FIG. 5 position) wherein a path is provided to the conveyor drive 130 from the pump 102 through the valve 142 (when moved down from the position shown in FIG. 5) and the valve 118 (via output 126). The dump cylinders 28 are also controllable through the valve 118 by operating the reversing valve 108. With the rotary valve 118 in the normal operating position shown, moving the valve 108 to the left, pressurizes the outputs 122 to extend the dump cylinders 28 and move the basket 20 into the dump position. Moving the valve 108 the opposite direction pressurizes the line 124 and returns the base ends of the cylinders 28 to the reservoir 104 through the valve 118 to lower the basket to the field-working position. The valve 118 includes a lock position 154 for locking the cylinders 32 and 28 against extension or retraction and preventing operation of the conveyor drive 130. A third or telescoping position (156) of the valve 118 provides a path from the pump 102 through the reversing valve to the output 120 for extending and retracting the telescoping cylinders 32. As is evident from FIG. 5, the telescoping cylinders 32 can only be operated when the valve 118 is in the third position (raised as depicted in FIG. 5), under which condition the dump cylinders 28 and the unloading conveyor drive 130 are blocked against operation.

The Interlock Structure

To prevent the rotary valve 118 from being moved from the third position (156) when the basket portions 26 and 30 are telescoped to a position wherein damage could occur to harvester if the dump cylinders 128 or the conveyor 130 were to be operated, interlock structure 160 is provided between the basket 20 and the valve 118. The interlock structure 160 includes a feeler device 162 responsive to retraction of the basket toward the compact position, and a valve inhibitor 164 operably connected to the feeler device 162 which locks the valve 118 in the basket telescope position (156) until the basket 30 is extended a preselected distance beyond which no damage will occur if the dump cylinders 28 or the conveyor drive 130 are operated.

As best seen in FIG. 4, rotary valve 118 is connected to the base end of one of the cylinders 28 and includes a handle 170 rotatably mounted on the harvester frame 12 and having a bifurcated shaft 174 joined by a connector 176. The connector 176 includes a tubular member 178 fixed to the innermost portion of the shaft 174 by a radially extending roll pin 182 and to the outer portion of the shaft 174 by a quick attachment pin 184. The handle 170 includes a hand grip portion 190 extending at a right angle to the axis of the outer portion of the shaft 174. The handle 170 is shown in the position corresponding to the basket telescope position 156 of FIG. 5, and is rotatable in the clockwise direction to a generally horizontal position corresponding to the normal operating position 152 of the valve 118. From the horizontal position, the handle 170 is rotatable to a downwardly directed position wherein the valve 118 is in the locked position (154).

The valve inhibitor 164 is responsive to the movement of the receptacle toward the compact position for preventing movement of the handle 170 from the telescoping position shown in FIG. 4 to the normal operating position (152 of FIG. 5) when the upper basket portion 30 is telescoped downwardly below position $R_1$ of FIG. 1. The inhibitor 164 includes a pair of parallel spaced plates 204 mounted on the harvester and rotatably supporting the connector 176 with the roll pin 182 located between the plates. An interference plate 208 is pivotally connected for rocking between the plates 204 by a pin 210. The plate 208 is rockable between a first noninterfering position (as shown in FIG. 4), and an interfering position wherein a leading edge 212 of the plate projects in the to path of the roll pin 182 to prevent the handle 170 from being rotated away from the basket telescoping position shown in FIG.4. The plate 208 is rockable between positions by a sheathed push-pull cable 220 having one end connected to the feeler device 162 and an opposite end 222 projecting through an upright slot 224 in one of the plates 204. When the basket 30 is retracted toward the compact position below the lowest operating position $R_1$ (FIG. 1), the cable is moves to rock the edge 212 in a position against the roll pin 182. Thereafter, movement of the handle 170 to change the position of the valve 118 can only occur after the basket has again been extended to the $R_1$ position or beyond.

As shown in FIG. 4, the feeler device 162 includes a pivoted camming member 230 connected to a forward wall 232 and located below the bottom of the upper basket portion 30 when the basket is in an extended operating position. The member 230 has an edge 234 which projects through a slot 236 in the wall 232 and into the telescoping path of the basket portion 30. A bracket 238 supports the camming member 230 on the wall 232 for rocking about an upright axis. An angle bracket 240 is connected by bolts 242 to the member 230 and by a cable connector 244 to one end of the cable 220. A spring 246 is tensioned between the bracket 240 and a panel 248 on the lower basket portion 26 to bias the edge 234 through the slot 236. The upper basket portion 30 when telescoped downwardly within the lower basket portion 26 contacts the angled edge 234 to rock the member 230 about the pivot. The cable wire will be pulled within its sheath to move the cable end 222 upwardly (as viewed in FIG. 4) and rock the interference plate against the roll pin 182 to prevent movement of the handle 170 away from the position corresponding to the telescoping position of the valve. Therefore, the operator will not be able to operate the unloading mechanisms until the plate 208 is moved out of interfering relationship with the pin 182. After the basket has again been extended to the $R_1$ position or beyond so that the area next to the slot 236 is open, the bias of the spring 246 will rotate the member 230 to urge the edge 234 fully through the slot 236. The member 230 thereby pushes the cable wire within the sheath and causes the cable end 222 to move downwardly and rotate the plate 208 out of the path of the roll pin 182. Once the roll pin 182 is free to rotate, normal dumping operations can be selected by rotating the handle 170 and moving the valve to the operating position (152 of FIG. 5). In addition, the locking position (154) of the valve 118 can be selected by rotating the handle approximately 180 degrees from the position shown in FIG. 4.

Having described the preferred embodiment, it will become apparent that various modifications can be made without departing from the scope of the invention defined below.

I claim:

1. In a harvester having an unloadable crop receiving receptacle, a source of hydraulic fluid under pressure, a hydraulically controlled unloading mechanism, and a hydraulically controlled retracting mechanism for moving the receptacle between a compacted storage position and an expanded operating position, an interlock system for preventing operation of the unloading mechanism when the receptacle is retracted, comprising:

a valve connected to the source of hydraulic fluid and to the unloading and retracting mechanisms, said valve including operator control means moveable between a first control position wherein the source is connected to the retracting mechanism for moving the receptacle between the storage and operating positions, and a second control position wherein the source is connected to the unloading mechanism; and a lockout control operably connected to the valve and including means responsive to the movement of the receptacle toward the compact position for preventing movement of the operator control means to the second position.

2. The invention as set forth in claim 1 wherein the means responsive to the movement comprises means for locking the control means in the first control position until the receptacle is moved toward the expanded operating position.

3. The invention as set forth in claim 1 wherein the lockout control comprises a mechanical linkage including a member movable in response to relative movement between receptacle portions.

4. The invention as set forth in claim 1 wherein the valve comprises a rotary valve and the operator control means includes a moveable handle, and wherein the means responsive to the movement includes a handle lock preventing movement of the handle away from a position corresponding to the first control position.

5. The invention as set forth in claim 4 wherein the handle includes a projecting member and the handle lock comprises an element moveable into and out of interfering relationship with the projecting member.

6. The invention as set forth in claim 5 wherein the element is moveable into interfering relationship with the projecting member in response to movement of the receptacle toward the storage position.

7. The invention as set forth in claim 4 including a cable, wherein the handle lock includes a pivoting member operably connected to one end of the cable, and a cable actuator connected to the opposite end of the cable for moving the cable in response to relative movement between portions of the receptacle remote from the handle lock.

8. The invention as set forth in claim 7 wherein the receptacle includes two telescoping portions and the cable actuator is responsive to telescoping movement of one portion relative to the other portion.

9. The invention as set forth in claim 1 wherein the receptacle has at least upper and lower expanded operating positions, and wherein the means responsive to the movement of the receptacle includes a feeler member responsive to the movement of the receptacle to a position below the lower position.

10. In a harvester having an unloadable crop receiving receptacle, a source of hydraulic fluid under pressure, first and second hydraulically controlled mechanisms for controlling receptacle position and crop unloading functions, respectively, an interlock system for preventing operation of the second mechanism when the receptacle is in a preselected position, the interlock system comprising:

a first valve connected to the source of hydraulic fluid for controlling fluid flow direction, a second valve connected between the first valve and the first and second mechanisms, said valve having a first control position wherein the source is connected to the first control mechanism for moving the receptacle between a transport position and an operating position, and a second control position wherein the source is connected to the second mechanism for unloading the receptacle;

means for moving the first valve between forward and reverse flow positions for controlling receptacle movement when the second valve is in the first control position; and means responsive to the movement of the receptacle toward the transport position when the second valve is in the first control position for locking the second valve in the first control position until the receptacle is moved toward the operating position.

11. The invention as set forth in claim 10 wherein the second valve includes an operator control, the second mechanism includes a dump cylinder for moving the receptacle between filling and dumping positions, the first mechanism includes a telescoping cylinder for telescoping one portion of the receptacle with respect to another portion, and the means responsive to the movement of the receptacle includes a mechanical linkage connected between the second valve and the receptacle and responsive to telescoping of the receptacle for movement into and out of interfering relationship with the operator control.

12. The invention as set forth in claim 11 wherein the second valve is supported from the dump cylinder.

13. The invention as set forth in claim 12 wherein the second valve includes an operator control handle, and wherein the mechanical linkage includes a control handle lock.

14. The invention as set forth in claim 11 wherein the mechanical linkage includes a feeler member moveable in response to telescoping of the receptacle beyond a preselected position.

15. The invention as set forth in claim 14 wherein the receptacle includes at least two operating positions including a fully extended operating position and a reduced size operating position wherein the receptacle is partially telescope, said feeler member being responsive to telescoping of the receptacle beyond the partially telescoped position for facilitating valve locking.

* * * * *